US012358760B2

(12) United States Patent
Thomson et al.

(10) Patent No.: US 12,358,760 B2
(45) Date of Patent: Jul. 15, 2025

(54) ARRANGEMENTS FOR ROTATIONAL APPARATUS

(71) Applicant: Verton IP PTY LTD, Archerfield (AU)

(72) Inventors: Stanley Thomson, Archerfield (AU); Joel Kok, Archerfield (AU); Hefin Evans, Archerfield (AU); Gerrard Hickson, Archerfield (AU)

(73) Assignee: Verton IP PTY LTD, Archerfield (AU)

( * ) Notice: Subject to any disclaimer, the term of this patent is extended or adjusted under 35 U.S.C. 154(b) by 318 days.

(21) Appl. No.: 17/632,377

(22) PCT Filed: Jul. 31, 2020

(86) PCT No.: PCT/AU2020/050788
§ 371 (c)(1),
(2) Date: Feb. 2, 2022

(87) PCT Pub. No.: WO2021/022321
PCT Pub. Date: Feb. 11, 2021

(65) Prior Publication Data

US 2022/0274808 A1 Sep. 1, 2022

(30) Foreign Application Priority Data

Aug. 2, 2019 (AU) ................................ 2019902777

(51) Int. Cl.
*B66C 13/08* (2006.01)
*B66C 1/10* (2006.01)

(52) U.S. Cl.
CPC .............. *B66C 13/08* (2013.01); *B66C 1/108* (2013.01)

(58) Field of Classification Search
CPC ......... G01C 21/18; B66C 1/108; B66C 13/06; B66C 13/08
See application file for complete search history.

(56) References Cited

U.S. PATENT DOCUMENTS 5,071,184 A * 12/1991 Dessaux ................. B66C 13/44 294/82.15
10,155,569 B2 12/2018 Kyrre
(Continued)

FOREIGN PATENT DOCUMENTS

CN 102674156 A 9/2012
DE 2009847 A1 9/1971
(Continued)

OTHER PUBLICATIONS

International Search Report issued in International Application No. PCT/AU2020/050788 issued on Sep. 17, 2020.
(Continued)

*Primary Examiner* — Moshe Wilensky
(74) *Attorney, Agent, or Firm* — Quinn IP Law

(57) ABSTRACT

An apparatus for controlling rotational orientation of a load suspended from the apparatus comprises a housing or framework for coupling to the load. At least one torque generating device is mounted to the housing or framework. A motorized frictionless swivel is coupled directly or indirectly to the housing or framework and to one or more lines suspending the load. A controller in communication with the torque generating device and the motorized frictionless swivel controls a proportion of rotational force applied to the load from the torque generating device and the motorized frictionless swivel to control the rotational orientation of the load. One or more thrusters movably mounted directly or indirectly to the housing or framework via respective mounting elements vary a position of the thrusters from a centre of the housing or framework and the controller controls a proportion of rotational force applied to the load from the thrusters.

20 Claims, 7 Drawing Sheets

(56) References Cited

U.S. PATENT DOCUMENTS

| | | | | |
|---|---|---|---|---|
| 2015/0344271 | A1 | 12/2015 | Schneider | |
| 2019/0375615 | A1* | 12/2019 | Markwell | ............... B66C 13/06 |

FOREIGN PATENT DOCUMENTS

| | | | |
|---|---|---|---|
| JP | S60114180 | U | 8/1985 |
| JP | H07267577 | A | 10/1995 |
| JP | H09132382 | A | 5/1997 |
| JP | H09309687 | A | 12/1997 |
| JP | 2013035651 | A | 2/2013 |
| JP | 2016210607 | A | 12/2016 |
| WO | 2015059498 | A1 | 4/2015 |
| WO | 2018090104 | A1 | 5/2018 |

OTHER PUBLICATIONS

The extended European search report for European application EP20851075, dated Oct. 6, 2023.

* cited by examiner

ARRANGEMENTS FOR ROTATIONAL APPARATUS

CROSS REFERENCE TO RELATED APPLICATIONS

This application claims the benefit of Australian Patent Application No. 2019/902,777 filed on 2 Aug. 2019, the disclosure of which is hereby incorporated by reference. This application further claims the benefit of International Patent Application No. PCT/AU2020/050788 filed on 31 Jul. 2020, the disclosure of which is hereby incorporated by reference.

FIELD OF THE INVENTION

The present invention relates to improved arrangements for rotational apparatus. In particular, embodiments of the present invention relate to improved arrangements for orientation control apparatus for larger loads and associated methods.

BACKGROUND TO THE INVENTION

In industries such as, but not limited to transportation and construction, loads are suspended, moved and relocated multiple times before being placed in a final position. The movement of suspended loads, for example, via cranes, can pose a risk to surrounding workers and structures. While certain aspects of movement can be controlled by the crane, rotation of a load can often be unpredictable and influenced suddenly by environmental factors, such as wind and/or the nature of the load itself. It is known to control the rotation of the load by using one or more gyroscopes. Indeed, the Applicant has devised improved load management systems and methods for the tracking and control of loads which include control moment gyroscope (CMG) modules in which the orientation of the suspended load is controlled by transferring the angular momentum within the control moment gyroscopic modules. The Applicant's improved load management systems and methods are the subject of International patent application no. PCT/AU2016/050941 which is incorporated herein by reference in its entirety.

In addition, there are other known technologies utilising other physical principles to achieve rotational control, such as the use of fans and the movement of a liquid around an enclosed chamber. However, none of these technologies address the problems encountered with very heavy, long and/or wide loads. For example, whilst one of the features of the Applicant's existing devices is the ability to scale both the size and the number of individual gyroscopic modules, which gives the system considerable flexibility, there will be situations where space, weight and/or economic constraints require further functionality to achieve a viable solution.

Limitations of the existing systems arise with very heavy loads, and with very long or wide loads. One example of such a load is a wind power generation turbine blade. Wind turbine blades are very long in comparison to their mass, giving rise to very high rotational inertia compared to the mass, and the potential for very high unbalanced wind loads. In contrast, there are components of offshore structures, such as large vertical columns or pipes, which have a very high concentrated mass, so that friction in a swivel between a crane hook and a crane hoist rope becomes a significant factor in the total torque required to orient the load.

The reference to any prior art in this specification is not, and should not be taken as, an acknowledgement or any form of suggestion that the prior art forms part of the common general knowledge.

OBJECT OF THE INVENTION

It is a preferred object of the present invention to provide an improved arrangement for rotational apparatus, and/or an improved method, and in particular, an improved orientation control apparatus that addresses or at least ameliorates one or more of the aforementioned problems of the prior art and/or provides a useful commercial alternative.

SUMMARY OF THE INVENTION

Generally, the present invention relates to improved arrangements for rotational apparatus, and in particular to orientation control apparatus for controlling the rotational orientation of larger loads suspended from the apparatus, and associated methods.

In one form, although not necessarily the broadest or only form, the invention resides in an orientation control apparatus for controlling rotational orientation of a load suspended from the apparatus, the apparatus comprising:

- a housing or framework for coupling to the load;
- at least one gyroscope or gyroscopic module mounted to the housing or framework;
- one or more thrusters movably mounted directly or indirectly to the housing or framework via one or more mounting elements to vary a position of the one or more thrusters from a centre of the housing or framework; and
- a controller in communication with the at least one gyroscope or gyroscopic module, the one or more thrusters and the one or more mounting elements to control a proportion of rotational force applied to the load from the at least one gyroscope or gyroscopic module and the one or more thrusters to control the rotational orientation of the load.

Suitably, the apparatus comprises a motorized frictionless swivel coupled directly or indirectly to the housing or framework and to one or more lines suspending the load and the controller is in communication with the motorized frictionless swivel to control a proportion of rotational force applied to the load from the motorized frictionless swivel.

According to another embodiment, although not necessarily the broadest embodiment, the invention resides in an orientation control apparatus for controlling rotational orientation of a load suspended from the apparatus, the apparatus comprising:

- a housing or framework for coupling to the load;
- at least one torque generating device mounted to the housing or framework;
- a motorized frictionless swivel coupled directly or indirectly to the housing or framework and to one or more lines suspending the load; and
- a controller in communication with the at least one torque generating device and the motorized frictionless swivel to control a proportion of rotational force applied to the load from the at least one torque generating device and the motorized frictionless swivel to control the rotational orientation of the load.

Suitably, the apparatus comprises one or more thrusters movably mounted directly or indirectly to the housing or framework via one or more mounting elements to vary a position of the one or more thrusters from a centre of the housing or framework and the controller is in communication with the one or more thrusters to control a proportion of rotational force applied to the load from the one or more thrusters.

According to another embodiment, although not necessarily the broadest embodiment, the invention resides in an orientation control apparatus for controlling rotational orientation of a load suspended from the apparatus, the apparatus comprising:

a housing or framework for coupling to the load;

a motorized frictionless swivel coupled directly or indirectly to the housing or framework and to one or more lines suspending the load;

one or more thrusters movably mounted directly or indirectly to the housing or framework via one or more mounting elements to vary a position of the one or more thrusters from a centre of the housing or framework; and a controller in communication with the motorized frictionless swivel and the one or more thrusters to control a proportion of rotational force applied to the load from the motorized frictionless swivel and the one or more thrusters to control the rotational orientation of the load.

Suitably, the apparatus comprises at least one torque generating device mounted to the housing or framework and the controller is in communication with the at least one torque generating device to control a proportion of rotational force applied to the load from the at least one torque generating device.

In another form, although not necessarily the broadest form, the invention resides in a method of controlling rotational orientation of a load, the method comprising:

coupling a housing or framework to the load;

mounting at least one torque generating device to the housing or framework;

movably mounting one or more thrusters directly or indirectly to the housing or framework via one or more mounting elements to vary a position of the one or more thrusters from a centre of the housing or framework; and controlling the rotational orientation of the load by controlling a proportion of rotational force applied to the load from the at least one torque generating device and the one or more thrusters via a controller in communication with the at least one torque generating device, the one or more thrusters and the one or more mounting elements.

Suitably, the method comprises coupling a motorized frictionless swivel directly or indirectly to the housing or framework and to one or more lines suspending the load and the controller, in communication with the motorized frictionless swivel, controlling a proportion of rotational force applied to the load from the motorized frictionless swivel.

According to another embodiment, the invention resides in a method of controlling rotational orientation of a load, the method comprising:

coupling a housing or framework to the load;

mounting at least one torque generating device to the housing or framework;

coupling a motorized frictionless swivel directly or indirectly to the housing or framework and to one or more lines suspending the load; and controlling the rotational orientation of the load by controlling a proportion of rotational force applied to the load from the at least one torque generating device and the motorized frictionless swivel via a controller in communication with the at least one torque generating device and the motorized frictionless swivel.

Suitably, the method comprises movably mounting one or more thrusters directly or indirectly to the housing or framework via one or more mounting elements to vary a position of the one or more thrusters from a centre of the housing or framework and the controller, in communication with the one or more thrusters, controlling a proportion of rotational force applied to the load from the one or more thrusters.

According to another embodiment, the invention resides in a method of controlling rotational orientation of a load, the method comprising:

coupling a housing or framework to the load;

coupling a motorized frictionless swivel directly or indirectly to the housing or framework and to one or more lines suspending the load;

mounting one or more thrusters movably directly or indirectly to the housing or framework via one or more mounting elements to vary a position of the one or more thrusters from a centre of the housing or framework; and controlling the rotational orientation of the load by controlling a proportion of rotational force applied to the load from the motorized frictionless swivel and the one or more thrusters by a controller in communication with the motorized frictionless swivel and the one or more thrusters.

Suitably, the method comprises mounting at least one torque generating device to the housing or framework and controlling a proportion of rotational force applied to the load from the at least one torque generating device via the controller in communication with the at least one torque generating device.

Suitably, the at least one torque generating device is selected from the following: a gyroscope; a gyroscopic module, unit or device; a control moment gyroscope (CMG); a flywheel; a rotating mass, such as, but not limited to a mass of fluid moved around an enclosed void, or other rotational device capable of imparting torque on the load.

In some embodiments, the orientation control apparatus comprises a torque generating device in the form of one or more drag elements or mechanisms to create drag in the presence of wind. Suitably, a position and/or an orientation of the one or more drag elements or mechanisms is adjustable to vary the drag, and therefore the torque generated by the one or more drag elements or mechanisms.

Suitably, the one or more drag elements or mechanisms is coupled to the load and is offset from the centre of the housing or framework.

Suitably, the one or more drag elements or mechanisms are coupled to be in communication with the controller and a power source.

In some embodiments, the one or more drag elements or mechanisms comprises one or more slats or plates.

Suitably, the one or more slats or plates are mounted to a rotatable rod or bar or the like driven by a drive means such that an orientation of the one or more drag elements or mechanisms is adjustable to vary the drag, and therefore the torque generated by the one or more drag elements or mechanisms.

Suitably, an angle of incidence of the one or more slats or plates to the wind can be adjusted about the axis of the rod or bar to vary a coefficient of drag of the one or more slats or plates relative to the wind thus varying the torque about the centre of the load due to the drag.

In some embodiments, a position of the one or more drag elements or mechanisms from the centre of the load is adjustable or variable.

Suitably, the motorized frictionless swivel comprises a top section or stator within which a bottom section or rotor rotates relative to the top section or stator on a thrust bearing, and a drive means to rotate the bottom section relative to the top section.

In some embodiments, the apparatus further comprises one or more sensors in communication with the controller to measure a rate of rotation of the top section or stator and the bottom section or rotor of the motorized frictionless swivel.

In some embodiments, the apparatus further comprises one or more sensors in communication with the controller to measure a rate of rotation of a crane boom.

Suitably, the motorized frictionless swivel is used for one or more of the following: to reduce the load for starting rotation of the load; to reduce the load for maintaining rotation of the load; for braking; for holding the load in a set orientation.

Further aspects and/or embodiments and/or features of the present invention will become apparent from the following detailed description.

BRIEF DESCRIPTION OF THE DRAWINGS

In order that the invention may be readily understood and put into practical effect, reference will now be made to preferred embodiments of the present invention with reference to the accompanying drawings, wherein like reference numbers refer to identical elements. The drawings are provided by way of example only, wherein.

Figure 1:
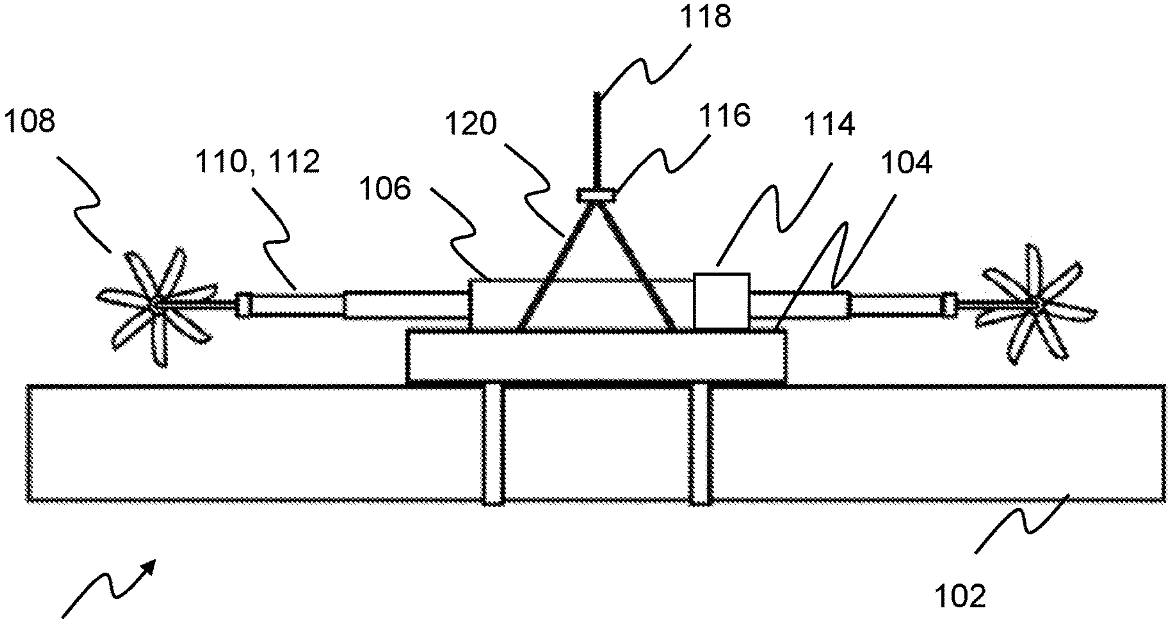
FIG. 1 is a front view of an orientation control apparatus for controlling rotational orientation of a suspended load according to a first embodiment of the present invention.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention. Some of the elements of the apparatus may be omitted from some of the drawings to aid clarity.

DETAILED DESCRIPTION OF THE INVENTION

Embodiments of the present invention are directed to improved arrangements for rotational apparatus, and in particular to orientation control apparatus for controlling the rotational orientation of larger loads suspended from the apparatus, and associated methods.

According to some embodiments, the orientation control apparatus comprises a supplementary source of torque to provide gross and fine control of rotational position of loads. According to some embodiments, the supplementary source of torque is a fan, or multiple fans, or other types of thrusters, that have the characteristic of constant thrust, hence torque, and have an increased effect with increased distance from the centre of gravity.

According to some embodiments, the orientation control apparatus comprises a mechanical drive between a crane hook and an upper part of a swivel of the crane hook to force relative rotation between the hook and a hook block, effectively eliminating, on demand, the friction inherent in the swivel of the crane hook.

According to some embodiments, the orientation control apparatus comprises a controller or control system to control a proportion of rotational force applied to the load from different components of the apparatus or system that provide torque to achieve useable control of very large loads. Components of the system contribute rotational force as required in a closely controlled manner. The controller or control system optimises all aspects of the components to provide the most effective orientation output and control under a wide variety of loads and a range of environmental conditions. The different characteristics of each of the components providing rotational force, such as one or more torque generating devices, such as one or more gyroscopes or gyroscopic modules/units/devices, a powered swivel and one or more fans/thrusters, provide a high degree of freedom in configuring the complete system for flexibility and scalability.

According to some embodiments, the orientation control apparatus comprises a sub-module of the control system to: a) use one or more fans to reduce load swing, for example in offshore environments, where the tip of the crane is moving because a ship upon which it is mounted is moving; b) provide a damping effect by cycling the one or more fans off and on; c) direct application of thrust for lateral/longitudinal travel in addition to, or instead of rotation.

According to some embodiments, the orientation control apparatus comprises a power supply, for example, to achieve useable control of very large loads over extended periods that can possibly be encountered. According to some embodiments, one or more energy sources can be used, such as diesel-powered generators and/or high-performance batteries. Another option is to use an external power source, for example, to spin up the torque generating device, such as the gyroscope/gyroscopic module before the lift and revert to an onboard power source during the lift. A further option is to use the energy stored in gyroscopic rotors at times to feed back into the system for use in the other devices.

Embodiments of the present invention provides a viable method of minimising human input into suspended load handling over a much wider range of load types and environmental conditions.

Figure 2:
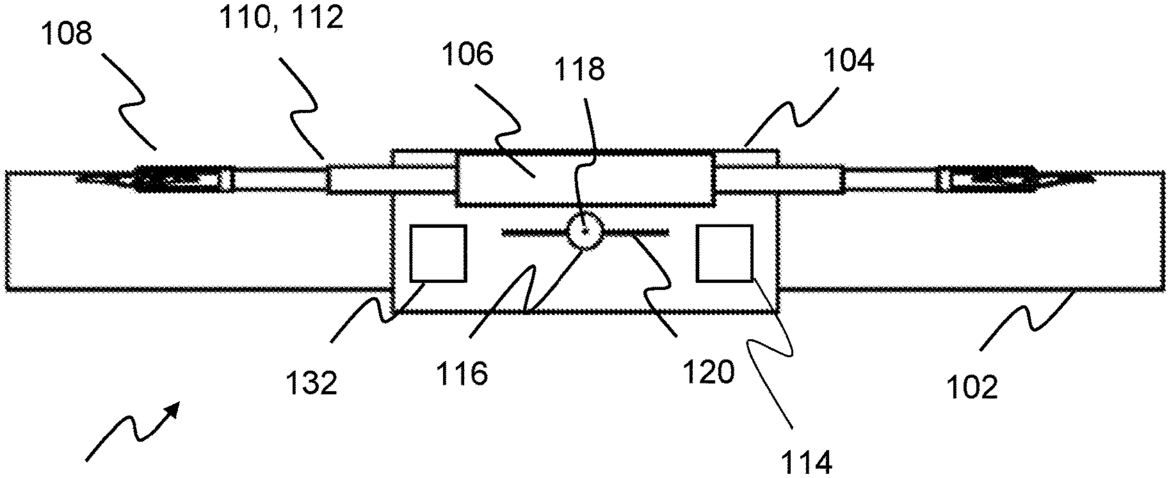
FIG. 2 is a plan view of the apparatus shown in FIG. 1.

With reference to FIGS. 1 and 2, according to some embodiments of the present invention, an orientation control apparatus 100 for controlling rotational orientation of a load 102 suspended from the apparatus 100 comprises a housing or framework 104, such as a blade yoke, for coupling to the load 102 and at least one torque generating device 106 mounted to the housing or framework 104. The at least one torque generating device 106 is selected from the following: a gyroscope; a gyroscopic module, unit or device; a control moment gyroscope (CMG); a flywheel; a rotating mass, such as, but not limited to a mass of fluid moved around an enclosed void or other rotational device capable of imparting torque on the load. The apparatus 100 comprises one or more thrusters, or thrust devices 108, which are movably mounted directly or indirectly to the housing or framework 104 via one or more mounting elements 110 to vary a position of the thrusters 108 from a centre of the housing or framework 104. In this embodiment, the apparatus comprises a pair of thrusters 108, other embodiments can comprise a single thruster 108 or more than two thrusters 108. In this embodiment, the thrusters 108 are mounted to the housing or framework 104 via respective telescopic arms 112. The orientation control apparatus 100 comprises a controller 114 in communication with the at least one torque generating device 106, the pair of thrusters 108 and the one or more mounting elements 110 to control a proportion of rotational force applied to the load 102 from the at least one torque generating device 106 and the pair of thrusters 108 to control the rotational orientation of the load 102. Hence, according to some embodiments, the controller 114 controls a proportion of rotational force applied to the load from at least two sources—from the at least one torque generating device 106, such as a gyroscope, gyroscopic module/unit/device, flywheel etc., and from the one or more thrusters 108.

According to some embodiments as shown in FIGS. 1 and 2, the apparatus 100 comprises a motorized frictionless swivel 116 coupled directly or indirectly to the housing or framework 104 and to one or more lines 118 suspending the load 104. In this embodiment, the motorized frictionless swivel 116 is coupled indirectly to the housing or framework 104 via a plurality of hoist lines 120 and to line 118 suspending the load 102, for example, from a crane (not shown). In this embodiment, the controller 114 is in communication with the motorized frictionless swivel 116 to also control a proportion of rotational force applied to the load from the motorized frictionless swivel 116. Hence, according to some embodiments shown in FIGS. 1 and 2, the controller 114 controls a proportion of rotational force applied to the load from at least three sources—from the at least one torque generating device 106, from the one or more thrusters 108 and from the motorized frictionless swivel 116.

The orientation control apparatus 100 comprises a power supply or power source 132 coupled to the at least one torque generating device 106, the one or more thrusters 108, the mounting elements 110 and the motorized frictionless swivel 116.

According to other embodiments, the orientation control apparatus 100 for controlling rotational orientation of the load 102 suspended from the apparatus 100 comprises the housing or framework 104 for coupling to the load 102, at least one torque generating device 106 mounted to the housing or framework, the motorized frictionless swivel 116 coupled directly or indirectly to the housing or framework 104 and to one or more lines 118 suspending the load and the controller 114. In such embodiments, the controller 114 is in communication with the at least one torque generating device 106 and the motorized frictionless swivel 116 to control a proportion of rotational force applied to the load 102 from the at least one torque generating device 106 and the motorized frictionless swivel 116 to control the rotational orientation of the load 102.

According to further embodiments, the orientation control apparatus 100 for controlling rotational orientation of the load 102 suspended from the apparatus 100 comprises the housing or framework 104 for coupling to the load 102, the motorized frictionless swivel 116 coupled directly or indirectly to the housing or framework 104 and to one or more lines 118 suspending the load, the one or more thrusters 108 movably mounted directly or indirectly to the housing or framework 104 via one or more mounting elements 110 to vary a position of the one or more thrusters 108 from a centre of the housing or framework 104 and the controller 114. In such embodiments, the controller 114 is in communication with the motorized frictionless swivel 116 and the one or more thrusters 108 to control a proportion of rotational force applied to the load 102 from the motorized frictionless swivel 116 and the one or more thrusters 108 to control the rotational orientation of the load 102.

Hence, different embodiments of the orientation control apparatus 100 of the present invention comprise different combinations of sources of rotational force, or torque, which are individually controlled in concert to provide the desired rotational force, or torque, to control the rotational orientation of the load according to the particular application.

The one or more movable mounting elements 110 to vary the position of the one or more thrusters 108 can be in the form of telescoping frames or arms, as shown in FIGS. 1 and 2, or can be in the form of other movable elements, such as hinged, folding or pivoting arms, frames or rods, to provide variable separation from the centre of gravity during operation. In other embodiments, the one or more thrusters 108 can be attached to rigging using special purpose or standard spreader bars. In some embodiments, the one or more mounting elements 110 can be attached to the load 102 during operation and attached to the rigging for transport and set up. In other embodiments, it is envisaged that the one or more thrusters 108 are mounted in respective drones that are flown into position at either end of a load 102 and are attached thereto by any suitable means. The thrust from the drones is reoriented from vertical to horizontal. At the end of the lift, the drones can be flown back to the rigging and reattached by any suitable means. The drones can be tethered or free-flying.

The one or more thrusters 108 can be in the form of fans, such as bi-directional fans, fixed pitch fans, variable pitch fans, single speed fans, variable speed fans, direct thrust fans, vectored thrust fans and can be, for example, petrol or battery powered. The fans can be self-contained in that they have their own power supply, or powered from a central power source 132 of the orientation control apparatus 100. In other embodiments, a hybrid power supply is used wherein the orientation control apparatus 100 comprises an on-board battery that charges while connected to a power and control hub that does not form part of the orientation control apparatus 100.

Figure 3:
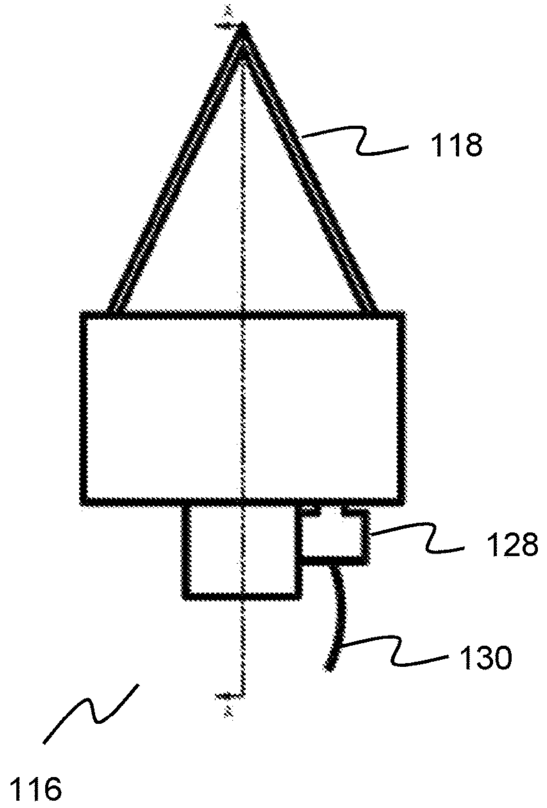
FIG. 3 is a front view of a motorized frictionless swivel comprising part of the apparatus shown in FIG. 1.
Figure 4:
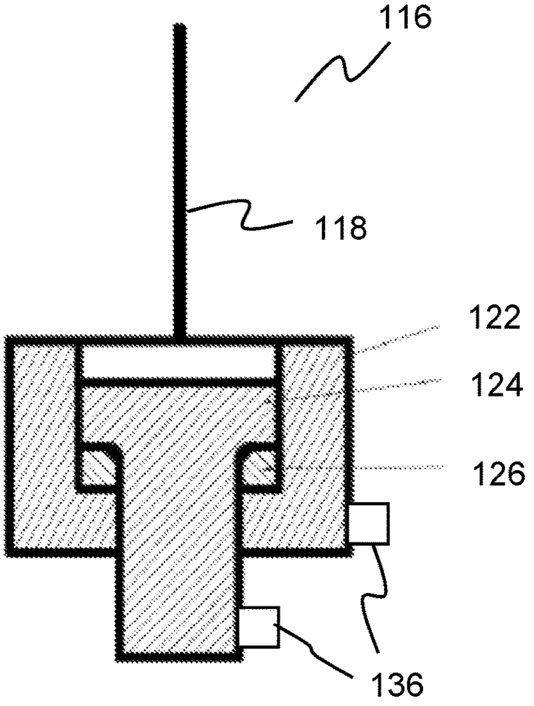
FIG. 4 is a sectional view of the motorized frictionless swivel shown in FIG. 3.
Figure 5:
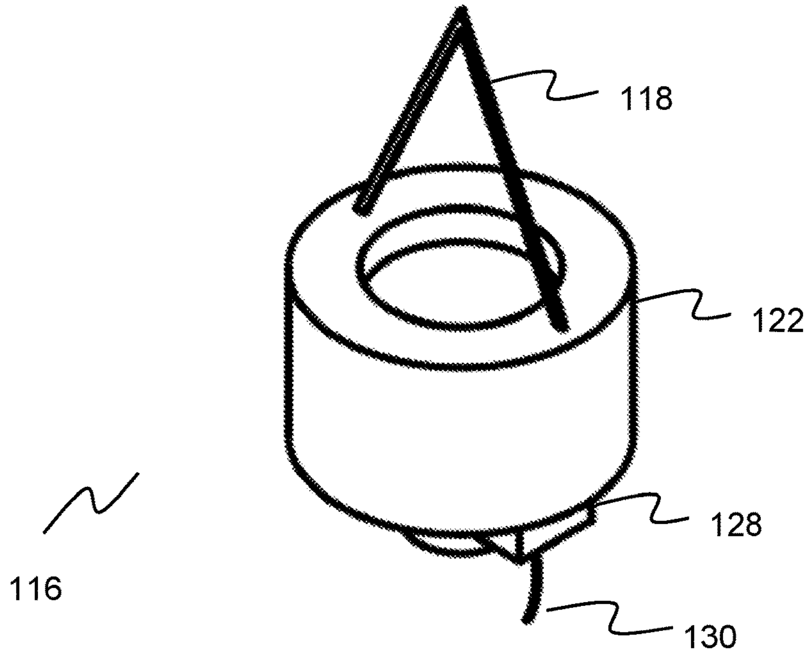
FIG. 5 is a front perspective view of the motorized frictionless swivel shown in FIG. 3.

With reference to FIGS. 3 to 5, according to some embodiments, the motorized frictionless swivel 116 comprises a top section or stator 122 within which a bottom section or rotor 124 rotates relative to the top section or stator 122 on a thrust bearing 126. A drive means 128, such as an electric motor, is mounted to the bottom section or rotor 124. The drive means 128 comprises a spur gear (not shown) mounted thereto which engages with a ring gear (not shown) mounted to, or otherwise part of an inside of the top section or stator 122. The drive means 128 can be any form of electromechanical, hydraulic or other form of drive means that can apply a relative torque. In some embodiments, power can be provided by a battery, a motor, or a generator and the battery, motor, or generator can be mounted on the top of the crane hook, or from the same source as the rotational mechanism. In some embodiments, the power source can be power source 132 as described herein. In some embodiments, one or more sensors 136 in communication with the controller 114 measure a rate of rotation of the top section or stator 122 and the bottom section or rotor 124 of the motorized frictionless swivel 116 and one or more sensors (not shown) in communication with the controller 114 measure a rate of rotation of the crane boom. In some embodiments, power and control cabling 130 can run along slings or chains or the like to the power supply 132 and controls. Operating the drive means 128 causes the bottom section or rotor 124 to rotate relative to the top section or stator 122. The motorized frictionless swivel 116 can be used to reduce the load at least for starting and maintaining rotation of the load 102. The motorized frictionless swivel 116 can be turned off or the torque reversed for faster braking at the end of rotational travel of the load.

There are various loads that must be overcome by the rotational mechanism(s) controlling suspended load orientation. Such loads comprise the rotational inertia of the load, which is a function of the load characteristics and is stable. Such loads also comprise the torques due to friction in the crane hook swivel and unbalanced wind pressure on the load 102 and rigging, which are both variable. The relative contributions of the two externally originating effects vary in accordance with wind speed and the ratio of load inertia to the area of the one or more drag elements or mechanisms 138 comprising one or more slats or plates 140, as described herein.

In the absence of wind effects, the friction in the swivel is the only reason for the load 102 to stop rotating after the rotational mechanisms have caused it to start rotating. If sufficient torque can be applied to the rotating bottom section or rotor 124 of the crane hook relative to the non-rotating top section or stator 122, the effect of swivel friction can be cancelled out, and a load 102 that has been made to rotate will continue to rotate without requiring additional input from the primary rotational mechanisms. If a control system is configured to take inputs from both the upper and lower sections of the hook in terms of rate and direction of rotation, the torque applied to rotate the bottom section or rotor 124 of the hook will cause it to rotate at the same rate as the rotational mechanisms are moving the suspended load 102. Once this is achieved the swivel can effectively be frictionless with respect to the rotational mechanism.

In the presence of unbalanced wind loads that are reducing the ability of the rotational mechanism to rotate the load, torque applied by the motorized swivel 116 can be used to augment the torque being generated by the rotational mechanism, by having the torque applied to the bottom section or rotor 124 of the hook to be greater than that required to overcome swivel friction, in which case the motorized swivel 116 will increase the effective rotational capacity of the rotational mechanism.

Conversely, if the load 102 is rotating and is required to be slowed or stopped, applying torque to the bottom section or rotor 124 of the hook relative to the top section or stator 122 in the reverse direction will assist in bringing the load 102 to a stop, effectively increasing the braking ability of the rotational mechanism.

In all cases the torque generated by the motorised swivel 116 cannot result in torque applied to the crane hoist rope (or ropes) in excess of their torsional stiffness, although some limited amount of twist is acceptable. Sensors 136 on the non-rotating top section or stator 122 of the hook monitor if the hoist ropes are approaching the limit of allowable twist. Additional sensors (not shown) on the crane boom would be required to allow a compensation to be made if the crane was slewing, which would otherwise give an incorrect reading on actual hoist rope twist.

In summary, having the ability to provide torque between the upper and lower parts of the crane hook can be used to increase the effective rotational capacity of the rotational mechanism(s) at the start, during rotation, for braking, and for holding in a set orientation.

Figure 6:
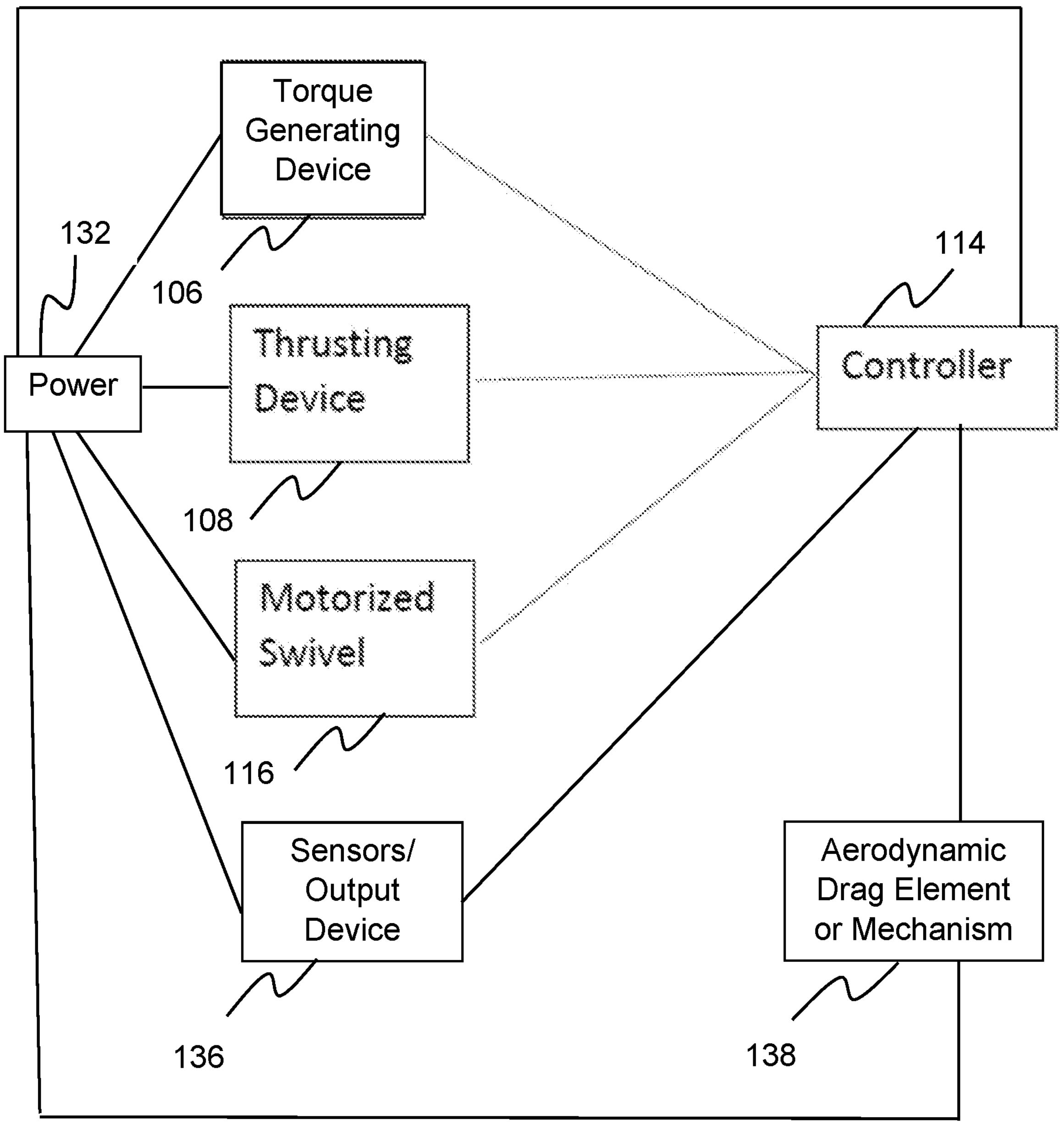
FIG. 6 is a schematic diagram of elements of the apparatus shown in FIG. 1.

With reference to FIG. 6, the controller 114 is in communication with the at least one torque generating device 106, such as a gyroscope, gyroscopic module/unit/device, a control moment gyroscope (CMG), a flywheel or other rotational device capable of imparting torque on the load, the one or more thrusters 108 and the motorized frictionless swivel 116. The controller 114 is in communication with a power supply or power source 132 which provides power to the one or more torque generating device 106, the one or more thrusters 108 and respective mounting elements 110, and the motorized frictionless swivel 116. The power supply or power source 132 can comprise one or more sources and be in the form of one or more batteries, a diesel engine, a petrol engine, or a hybrid thereof. In some embodiments, power is provided from the mains prior to the lift. Power can be maintained during the lift for functioning on the controller 114, the torque generating device 106, the one or more thrusters 108 and respective mounting elements 110 and the motorized frictionless swivel 116 using the power supply or power source 132 in the form of a smaller on-board battery or other power source. It will be appreciated that the controller 114 can also be in communication with one or more sensors 136 to obtain feedback, such as, but not limited to one or more cameras, a microphone, one or more positioning sensors, such as a real time kinematic global positioning sensor (RTK GPS), an inertial measurement unit (IMU), such as an IMU with nine degrees of freedom (DOF), a light detection and ranging (LIDAR) unit, one or more stereo cameras, one or more cameras for recording images for photogrammetry and/or simultaneous localization and mapping (SLAM) purposes, an anemometer and/or one or more output devices, such as a loudspeaker or light source.

Figure 7:
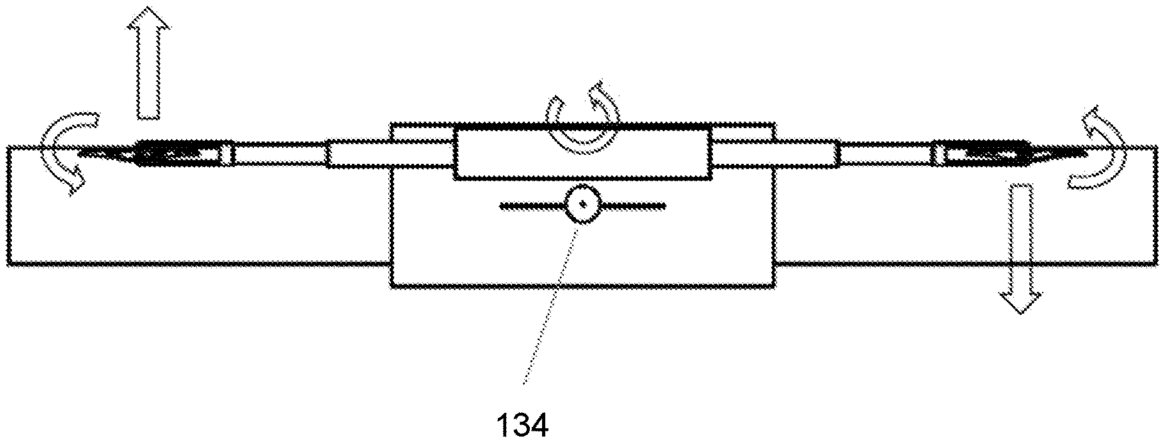
FIG. 7 is a plan view of the apparatus shown in FIG. 1 indicating operation according to one mode of operation.

With reference to FIG. 7, according to some embodiments, the one or more thrusters 108 are rigidly coupled to the one or more rotational devices, such as the torque generating device 106 via mounting elements 110 in the form of rigid arms. The arms can be telescopically, or otherwise extended and retracted, which provides adjustable moments for the one or more thrusters 108 about the pivot point 134. The one or more torque generating devices, such as the gyroscope or gyroscopic module 106 and one or more thrusters 108 work together, i.e. provide rotational force in the same direction, to rotate and orientate the load 102 with respect to the pivot point 134.

The pivot point 134 is frictionless, or substantially frictionless due to the motorized swivel 116. The pivot point 134 contributes negligible counter-acting moment to the combined applied moments of the one or more torque generating device 106 and the one or more thrusters 108.

The one or more torque generating device 106 and the one or more thrusters 108 can operate simultaneously, or can operate in relays, whereby the one or more thrusters 108 are used for large rotational angles and the one or more torque generating device 106, such as gyroscope or gyroscopic module is then deployed for final fine or precision orientation of the load.

Figure 8:
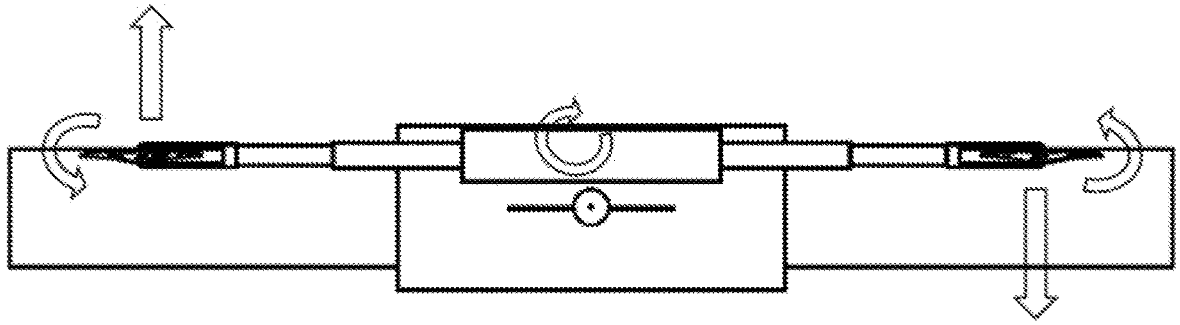
FIG. 8 is a plan view of the apparatus shown in FIG. 1 indicating operation according to another mode of operation.

With reference to FIG. 8, according to some embodiments, where the at least one torque generating device 106 is in the form of one or more gyroscope or gyroscopic module, the one or more thrusters 108 are used to provide rotational force, or torque in opposition to the one or more gyroscope or gyroscopic module 106 while the flywheels of the one or more gyroscope or gyroscopic module 106 are slewed back into reset positions. This opposing moment is carefully controlled/throttled, resulting in zero net moment on the load, and hence zero rotation, during the regenerative cycle.

The orientation control apparatus 100 of the present invention can be operated in a variety of operating modes. For example, all force/torque elements, i.e. the one or more torque generating device 106, the one or more thrusters 108 and the motorized frictionless swivel 116 can be operated together. Alternatively, a subset thereof can be operated in combination. In some operating modes, the one or more thrusters 108 provide wind load offset compensation and the one or more torque generating device 106 control inertia and fine positioning. In some operating modes, the one or more thrusters 108 hold the load while allowing the one or more torque generating device 106 to re-set to vertical for an optimal control position. In some operating modes, a combination of the force/torque elements are used working with a crane control system to provide full positional and rotational management. For example, the orientation control apparatus 100 of the present invention can be make it appear that a load, such as a turbine blade is rotating in the horizontal plane about a point that is not at the centre of gravity, by combining the slew and luff motions of the crane boom with the orientation motion from the one or more gyroscope or gyroscopic module 106 and the one or more thrusters 108.

Figure 9:
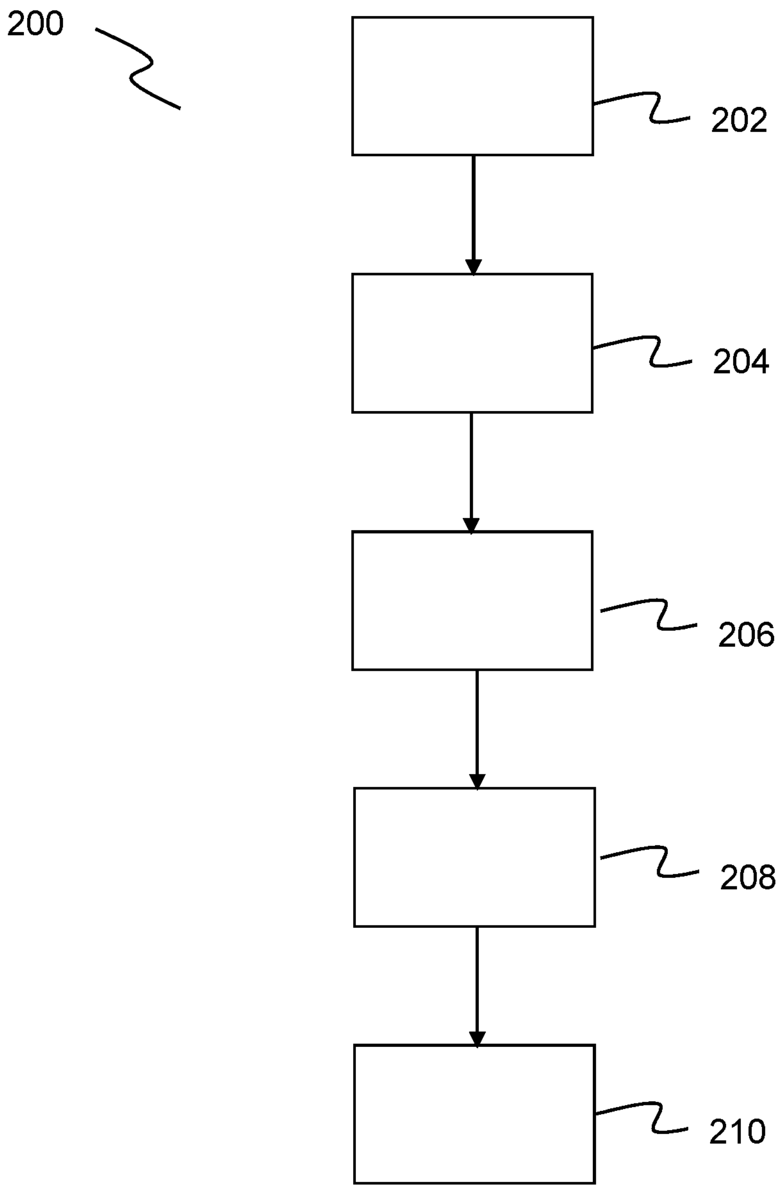
FIG. 9 is a general flow diagram illustrating methods of controlling rotational orientation of the load according to some embodiments of the present invention.

According to other aspects or forms, the invention resides in methods of controlling rotational orientation of the load 104. With reference to FIG. 9, and according to some embodiments, such methods 200 can comprise, at 202, coupling the housing or framework 104 to the load 102. At 204, such methods can comprise mounting at least one torque generating device 106 to the housing or framework 104. At 206, such methods can comprise movably mounting the one or more thrusters 108 directly or indirectly to the housing or framework 104 via the one or more mounting elements 110 to vary a position of the one or more thrusters 108 from a centre of the housing or framework 104. At 208, such methods can comprise controlling the rotational orientation of the load 102 by controlling a proportion of rotational force applied to the load 102 from the at least one torque generating device 106 and the one or more thrusters via the controller 114 in communication with the at least one torque generating device 106, the one or more thrusters 108 and the one or more mounting elements 110. According to some embodiments, the method 200 can comprise at 210 coupling the motorized frictionless swivel 116 directly or indirectly to the housing or framework 104 and to one or more lines 118 suspending the load 102 and the controller 114, in communication with the motorized frictionless swivel 116, controlling a proportion of rotational force applied to the load 102 from the motorized frictionless swivel 116. It will be appreciated that the method 200 may not include all steps where the source of rotational force is not being employed. For example, in some embodiments, the method will not comprise movably mounting the one or more thrusters 108 directly or indirectly to the housing or framework 104 via the one or more mounting elements 110 at 206 where only the at least one torque generating device 106 and the motorized frictionless swivel 116 are being employed.

Figure 10:
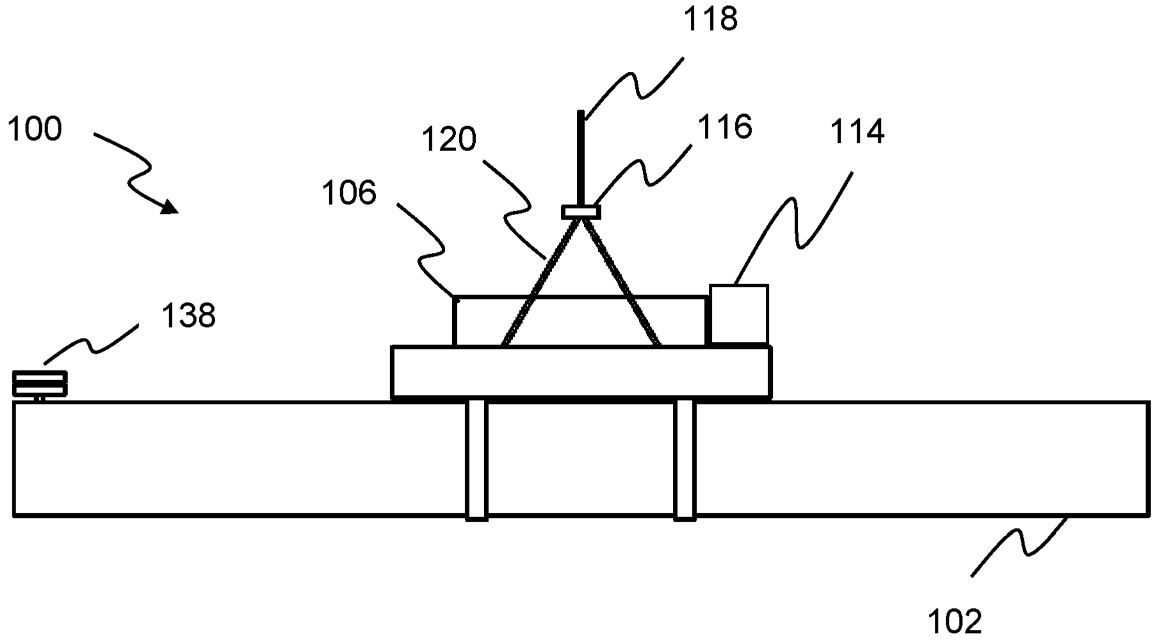
FIG. 10 is a front view of an orientation control apparatus for controlling rotational orientation of a suspended load according to another embodiment of the present invention.
Figure 11:
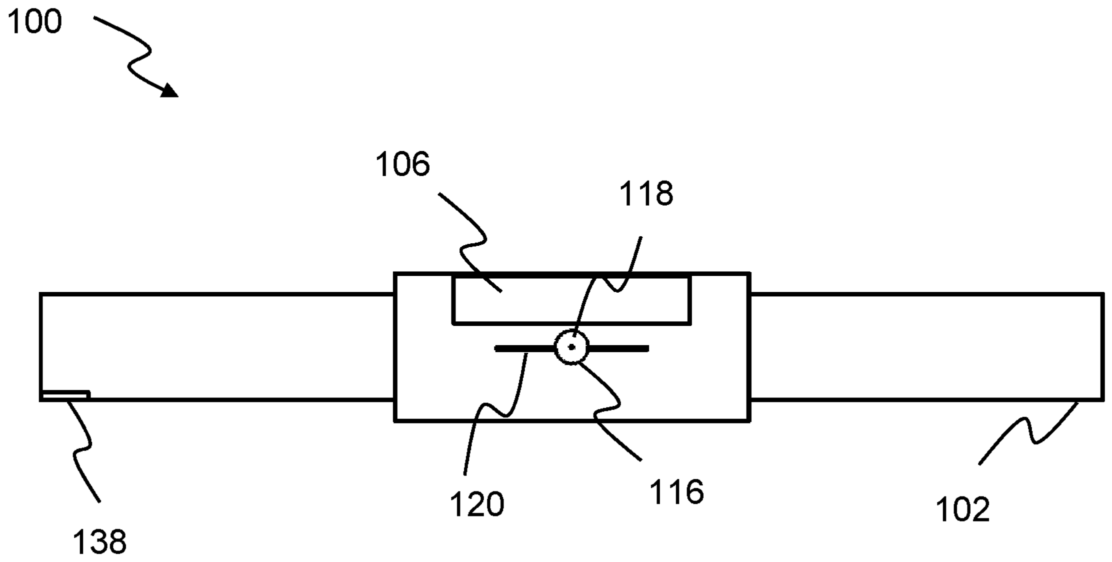
FIG. 11 is a plan view of the orientation control apparatus shown in FIG. 10.
Figure 12:
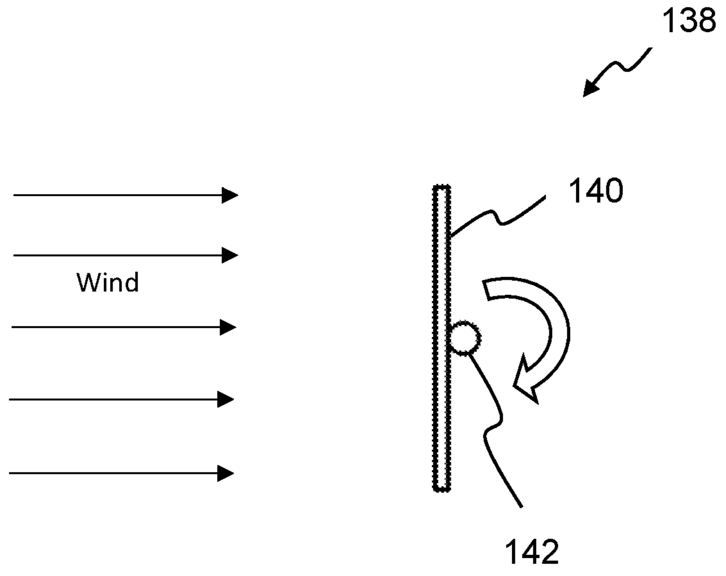
FIG. 12 is a side view illustrating operation of an aerodynamic drag mechanism of the orientation control apparatus shown in FIG. 10.

With reference to FIGS. 10 to 12, other embodiments of the orientation control apparatus 100 of the present invention comprises a torque generating device in the form of one or more drag elements or mechanisms 138 to create drag in the presence of wind. The one or more drag elements or mechanisms 138 is coupled to the load 102 and is offset from the centre of the housing or framework 104, for example, towards an end of the load 102. The one or more drag elements or mechanisms 138 are coupled to be in communication with the controller 114 and the power source 132. The one or more drag elements or mechanisms 138 can comprise one or more slats or plates 140 having, for example, a rectangular profile. In some embodiments, the one or more slats or plates 140 are mounted to a rotatable rod or bar 142 or the like driven by, for example, a motor or hydraulic or pneumatic arm or other drive means such that an orientation of the one or more drag elements or mechanisms 138 is adjustable to vary the drag, and therefore the torque generated by the one or more drag elements or mechanisms 138. The angle of incidence of the one or more slats or plates 140 to the wind can be adjusted about the axis of the rod or bar 142 to vary the coefficient of drag of the one or more slats or plates 140 relative to the wind thus varying the torque about the centre of the load 102 due to the drag. In some embodiments, a position of the one or more drag elements or mechanisms 138 from the centre of the load 102 is adjustable or variable, for example, via one or more of the mounting elements 110 as described herein.

The one or more drag elements or mechanisms 138 can be used as a substitute for the one or more thrusters 108 or the one or more torque generating devices 106, such as the gyroscopic modules, or in addition to the one or more thrusters 108 or the torque generating device 106, such as a gyroscopic module. The one or more thrusters 108 have been omitted from FIGS. 10 and 11 for the sake of clarity.

Hence, embodiments of the present invention address or at least ameliorate at least some of the aforementioned problems. For example, the orientation control apparatus 100 according to embodiments of the present invention comprises one or more supplementary source of rotational force, or torque to provide additional rotational control to that provide by a primary source of torque in the form of one or more torque generating device 106, that is particularly effective in controlling rotational motion of large and/or heavy loads. According to some embodiments, the one or more supplementary source of rotational force, or torque is in the form of one or more drag elements or mechanisms 138 and/or one or more thrusters 108, which provide constant thrust and hence torque, that have an increased effect with increased distance from the centre of gravity. The one or more thrusters 108 are movable via one or more mounting elements 110 to provide selectivity in the distance from the centre of gravity and thus the moment provided by the one or more thrusters 108. According to some embodiments, the one or more supplementary source of rotational force, or torque is in the form of the motorized frictionless swivel 116, which can be used in conjunction with, or instead of, the one or more thrusters 108. Various modes of operation as described herein provide further flexibility and adaptability regarding controlling rotational orientation of a suspended load via the orientation control apparatus 100.

In this specification, the terms "comprises", "comprising" or similar terms are intended to mean a non-exclusive inclusion, such that an apparatus that comprises a list of elements does not include those elements solely, but may well include other elements not listed.

Throughout the specification the aim has been to describe the invention without limiting the invention to any one embodiment or specific collection of features. Persons skilled in the relevant art may realize variations from the specific embodiments that will nonetheless fall within the scope of the invention. For example, it is envisaged that one or more features from two or more embodiments described herein can be combined to form one or more further embodiments.

The invention claimed is:

1. An orientation control apparatus for controlling rotational orientation of a load suspended from the apparatus, the apparatus comprising:

a housing or framework for coupling to the load;

at least one torque generating device mounted to the housing or framework;

one or more thrusters movably mounted to the housing or framework via one or more mounting elements to vary a position of the one or more thrusters from a centre of the housing or framework during a lifting event;

a motorized swivel coupled to the housing or framework and to one or more lines suspending the load; and a controller in communication with the at least one torque generating device, the one or more thrusters and respective mounting elements and the motorized swivel to control a proportion of rotational force applied to the load from at least two of the at least one torque generating device, the one or more thrusters and the motorized swivel to control the rotational orientation of the load wherein the at least one torque generating device is configured to provide a primary source of rotational force to the load, and the one or more thrusters and the motorized swivel are configured to operate to provide a supplementary rotational force to the load.

2. The apparatus of claim 1, wherein the at least one torque generating device is selected from the following: a gyroscope; a gyroscopic module, unit or device; a control moment gyroscope (CMG); a flywheel; a rotating mass, such as, but not limited to a mass of fluid moved around an enclosed void; another rotational device capable of imparting torque on the load; one or more drag elements or mechanisms to create drag in the presence of wind.

3. The apparatus of claim 2, wherein a position and/or orientation of the one or more drag elements or mechanisms is adjustable to vary the drag, and therefore the torque generated by the one or more drag elements or mechanisms.

4. The apparatus of claim 2, wherein the one or more drag elements or mechanisms is coupled to the load and is offset from the centre of the housing or framework; and wherein the one or more drag elements or mechanisms are coupled to be in communication with the controller and a power source.

5. The apparatus of claim 2, wherein the one or more drag elements or mechanisms comprises one or more slats or plates, the one or more slats or plates mounted to a rotatable rod or bar driven by a drive means such that an orientation of the one or more drag elements or mechanisms is adjustable to vary the drag, and therefore the torque generated by the one or more drag elements or mechanisms.

6. The apparatus of claim 5, wherein an angle of incidence of the one or more slats or plates to the wind can be adjusted about the axis of the rod or bar to vary a coefficient of drag of the one or more slats or plates relative to the wind thus varying the torque about the centre of the load due to the drag.

7. The apparatus of claim 5, wherein a position of the one or more drag elements or mechanisms from the centre of the load is adjustable or variable.

8. The apparatus of claim 1, wherein the motorized swivel comprises a top section or stator within which a bottom section or rotor rotates relative to the top section or stator on a thrust bearing, and a drive means to rotate the bottom section relative to the top section.

9. The apparatus of claim 8, further comprising:

one or more sensors in communication with the controller to measure a rate of rotation of the top section or stator and the bottom section or rotor of the motorized swivel; and one or more sensors in communication with the controller to measure a rate of rotation of a crane boom.

10. The apparatus of claim 1, wherein the motorized swivel is used for one or more of the following: to reduce the load for starting rotation of the load; to reduce the load for maintaining rotation of the load; for braking; for holding the load in a set orientation.

11. A method of controlling rotational orientation of a load, the method comprising:

coupling a housing or framework to the load;

mounting at least one torque generating device to the housing or framework;

movably mounting one or more thrusters to the housing or framework via one or more mounting elements to vary a position of the one or more thrusters from a centre of the housing or framework during a lifting event;

coupling a motorized swivel to the housing or framework and to one or more lines suspending the load; and controlling the rotational orientation of the load by controlling a proportion of rotational force applied to the load from the at least one torque generating device, and the one or more thrusters and the motorized swivel via a controller in communication with the at least one torque generating device, the one or more thrusters and the one or more mounting elements and the motorized swivel;

wherein the method of controlling rotational orientation of the load includes providing a primary source of rotational force from the at least one torque generating device and a supplementary source of rotational force from the one or more thrusters and/or motorized swivel independently thereof or in combination.

12. The method of claim 11, wherein the at least one torque generating device is selected from the following: a gyroscope; a gyroscopic module, unit or device; a control moment gyroscope (CMG); a flywheel; a rotating mass, such as, but not limited to a mass of fluid moved around an enclosed void; another rotational device capable of imparting torque on the load; one or more drag elements or mechanisms to create drag in the presence of wind.

13. The method of claim 12, wherein a position and/or orientation of the one or more drag elements or mechanisms is adjustable to vary the drag, and therefore the torque generated by the one or more drag elements or mechanisms.

14. The method of claim 12, wherein the one or more drag elements or mechanisms is coupled to the load and is offset from the centre of the housing or framework; and wherein the one or more drag elements or mechanisms are coupled to be in communication with the controller and a power source.

15. The method of claim 12, wherein the one or more drag elements or mechanisms comprises one or more slats or plates, the one or more slats or plates mounted to a rotatable rod or bar driven by a drive means such that an orientation of the one or more drag elements or mechanisms is adjustable to vary the drag, and therefore the torque generated by the one or more drag elements or mechanisms.

16. The method of claim 15, wherein an angle of incidence of the one or more slats or plates to the wind can be adjusted about the axis of the rod or bar to vary a coefficient of drag of the one or more slats or plates relative to the wind thus varying the torque about the centre of the load due to the drag.

17. The method of claim 15, wherein a position of the one or more drag elements or mechanisms from the centre of the load is adjustable or variable.

18. The method of claim 11, wherein the motorized swivel comprises a top section or stator within which a bottom section or rotor rotates relative to the top section or stator on a thrust bearing, and a drive means to rotate the bottom section relative to the top section.

19. The method of claim 18, further comprising:

one or more sensors in communication with the controller to measure a rate of rotation of the top section or stator and the bottom section or rotor of the motorized swivel; and one or more sensors in communication with the controller to measure a rate of rotation of a crane boom.

20. The method of claim 11, wherein the motorized swivel is used for one or more of the following: to reduce the load for starting rotation of the load; to reduce the load for maintaining rotation of the load; for braking; for holding the load in a set orientation.

* * * * *